United States Patent [19]

Leiber et al.

[11] Patent Number: 4,841,446

[45] Date of Patent: Jun. 20, 1989

[54] METHOD FOR MONITORING THE OPERATIONS OF AN ELECTROMECHANICAL CONTROL SYSTEM THAT ENSURES THE ADHESION OF WHEELS OF A MOTOR VEHICLE

[75] Inventors: Heinz Leiber, Oberriexingen; Hans-Joachim Ohnemüller, Reutlingen, both of Fed. Rep. of Germany

[73] Assignee: Daimler-Benz Aktiengesellschaft, Stuttgart, Fed. Rep. of Germany

[21] Appl. No.: 131,504

[22] Filed: Dec. 11, 1987

[30] Foreign Application Priority Data

Dec. 23, 1986 [DE] Fed. Rep. of Germany ....... 3644139

[51] Int. Cl.$^4$ .............................................. B60T 8/00
[52] U.S. Cl. .......................... 364/426.02; 364/426.01; 303/92; 303/97
[58] Field of Search .............. 364/426, 426.01, 426.02; 303/105, 106, 109, 97, 95, 103, 108, 92, 119; 180/197

[56] References Cited

U.S. PATENT DOCUMENTS

| | | | |
|---|---|---|---|
| 3,964,796 | 6/1976 | Bremer | 303/92 |
| 3,966,267 | 6/1976 | McNinch, Jr. et al. | 303/106 |
| 4,379,331 | 4/1983 | Watson | 364/426 |
| 4,759,589 | 7/1988 | Leiber | 303/97 X |
| 4,760,893 | 8/1988 | Sigl et al. | 303/109 X |
| 4,763,262 | 8/1988 | Leiber | 180/197 X |
| 4,763,263 | 8/1988 | Leiber | 180/197 X |

FOREIGN PATENT DOCUMENTS

| | | |
|---|---|---|
| 2758529 | 8/1979 | Fed. Rep. of Germany . |
| 3127301 | 8/1983 | Fed. Rep. of Germany . |
| 3206694 | 9/1983 | Fed. Rep. of Germany . |
| 3611822 | 10/1986 | Fed. Rep. of Germany . |
| 3545652 | 6/1987 | Fed. Rep. of Germany . |

Primary Examiner—Eugene R. Laroche
Assistant Examiner—Seung Ham
Attorney, Agent, or Firm—Barnes & Thornburg

[57] ABSTRACT

The proper functioning of a control system (such as an ABS, ASR) that secures the adhesion of the wheels, by analyzing wheel rotating speed signals, is determined by comparing acceleration signals determined from the wheel rotating speed signals with accelerated signals measured by acceleration sensors on the vehicle. If they do not correspond within given limits during absence of control system control signal, the control system is disabled by an error signal and a warning indicator is activated.

19 Claims, 2 Drawing Sheets

METHOD FOR MONITORING THE OPERATIONS OF AN ELECTROMECHANICAL CONTROL SYSTEM THAT ENSURES THE ADHESION OF WHEELS OF A MOTOR VEHICLE

BACKGROUND AND SUMMARY OF THE INVENTION

The invention relates to a method for monitoring the operations of an electromechanical control system that ensures the adhesion of wheels of a motor vehicle and to a safety switching arrangement for carrying out the indicated method.

It is generally known that the components of control systems of this type, such as the ABS (antilock brake systems) or the ASR (wheel slip control system), that are relevant to driving safety, must be monitored with respect to their correct functioning. From DE-PS No. 31 27 301, a safety switching arrangement is known to which certain input signals are fed and that evaluates these input signals by predetermined operating criteria, particularly the plausibility of the simultaneous occurrence of different input signals. If signals are present simultaneously that, if the ASR or ABS control system functions properly, should not occur simultaneously, the safety switching arrangement, by an error switching signal, interrupts the signal flow of the control system and warns the driver of the vehicle by switching on a control light.

It is known to use, in combination with wheel slip and antilock control systems, acceleration sensors that are fixed at the vehicle for forming certain reference signals, such as the longitudinal acceleration of the vehicle and the driving speed. This is shown in DE-OS No. 35 45 652 and corresponding U.S. patent application No. 943,693, filed Dec. 19, 1986. They are required mainly in order to be able to obtain, in the case of four-wheel driven vehicles equipped with ASR/ABS, at any time, references values for slip comparators that are independent of the slip conditions between the wheels and the ground, and they are therefore also relevant with respect to driving safety.

It is also known to use acceleration sensors in vehicles for the triggering control of passive safety systems, such as air bags and belt tighteners.

It is the objective of the invention to provide a process for the monitoring of operations of an electromechanical control system of the described type that permits the monitoring of an acceleration sensor in the motor vehicle that corresponds with a control system of this type as well as to develop the known safety switching arrangement such that it can be used for implementing the indicated process.

The proper functioning of a control system (such as an ABS, ASR) that secures the adhesion of the wheels, by analyzing wheel rotating speed signals, is determined by comparing acceleration signals determined from the wheel rotating speed signals with accelerated signals measured by acceleration sensors on the vehicle. If they do not correspond within given limits during absence of control system control signal, the control system is disabled by an error signal and a warning indicator is activated.

In principle, antilock and wheel slip control systems have wheel rotating speed sensors with signals converters. From their wheel rotating speed signals, the vehicle speed and acceleration can be determined as reference signals in known ways with some precision as long as only the unavoidable rolling slip is present at the wheels. However, as soon as the ABS or the ASR intervene, decelerations and accelerations occur at the slip-controlled wheels that change at a high frequency. Thus, a clear relationship can no longer be established between the wheel rotating speed signals and the vehicle speed or the vehicle acceleration, but can be represented only approximately by standard values.

The invention is based on the recognition that the signals of an acceleration sensor, that is fixed at the vehicle and that is used mainly for obtaining reference signals that are independent of the wheel slip, can be monitored by comparison with vehicle acceleration signals converted or calculated from wheel rotating speed signals, as long as the assigned control system does not intervene.

The blocking intervention of the safety switching arrangement into the signal flow of the control system, according to the invention, is prevented for two reasons when the control system at the time is in an operating cycle:

on the one hand, the control system that is operating at the time, for understandable reasons, must not be switched off "for reasons of safety";

on the other hand, the acceleration signals that are determined from the wheel rotating speeds and are measured by the acceleration sensor can then not be within the range of the conventional consistent band width, as indicated above.

The safety switching arrangement permits the simultaneous monitoring of the sensor acceleration signals that are assigned to the three coordinate axes of the vehicle, the longitudinal (x-) axis, the transverse (y-) axis and the vertical (z-) axis. The longitudinal and transverse accelerations of the vehicle are already included in the signal flow of the ABS and the ASR in a known way. The additional detection of vertical accelerations of the vehicle body (that is also know per se) becomes interesting, for example, when a vehicle is also equipped with an automatic spring-damper control system which also ensures the adhesion of the vehicle wheels. In the latter case, according to the invention, the vertical parts of the wheel acceleration signals must be obtained from the wheel acceleration signals by filtering out all other parts and can then be compared with vertical acceleration signals of the acceleration sensor that is fixed at the vehicle, naturally only while taking into account the transmission function of the spring-damper system.

Other objects, advantages and novel features of the present invention will become apparent from the following detailed description of the invention when considered in conjunction with the accompanying drawings.

DETAILED DESCRIPTION OF THE DRAWINGS

Figure 1:
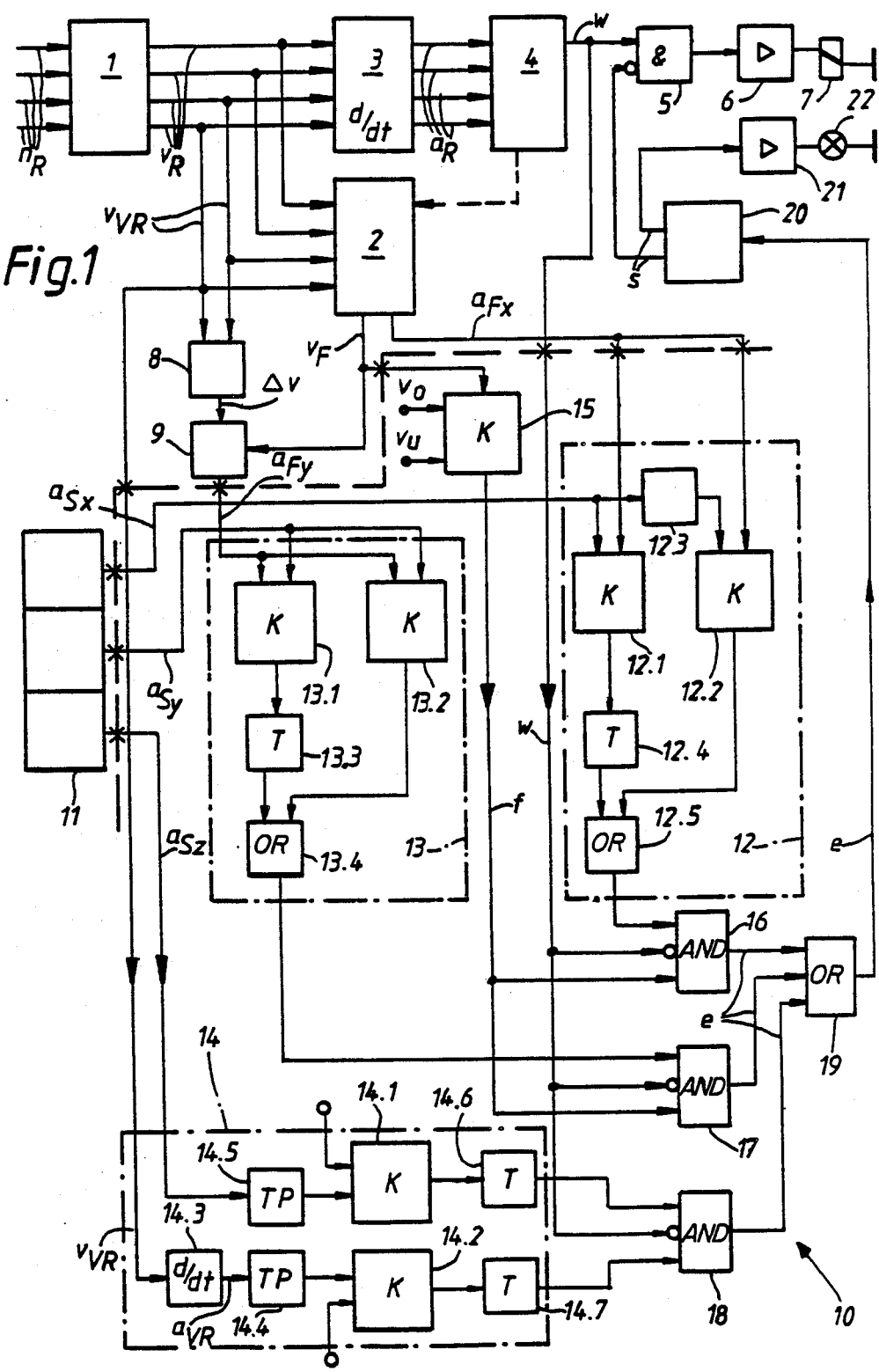
FIG. 1 is a block diagram of a safety switching arrangement that is connected to a four-channel ABS.

Referring to FIG. 1, wheel rotating speed signals $n_R$ are fed to a signal processing circuit 1 by not shown wheel rotating speed signal generators at the four wheels of a motor vehicle. For example, the process in circuit 1 could be Schmitt-triggers with hysteresis. Signal processing circuit 1 processes the rotating speed signals $n_R$ into wheel speed signals $v_R$ which are fed to a reference circuit 2 as well as to a differentiator 3. The differentiator 3, in turn, generates wheel acceleration signals $a_R$ that are directed to a logic unit 4 of an ABS. This logic unit 4, in turn, in a known way, generates a control signal w which, via an AND-gate 5 and an amplifier 6, causes the control of a symbolically shown electromagnetic brake pressure control valve 7 when the ABS intervenes. In addition to the normal input for the control signal w, the AND-gate 5 also has an inverting input for an error switching signal s, the generating of which will be described later. When the error switching signal s is present, the signal flow of the ABS is interrupted in the AND-gate 5, whereby AND-gate 5 is 10 switched to low.

Two wheel speed signals $v_{VR}$ that are derived from the rotating speed signals of the steerable wheels, thus of the front wheels, also reach a difference forming element 8. When the wheel speed signals $v_{VR}$ deviate from one another, for example, when a turn is driven, difference forming element 8 generates a speed differential signal $\Delta v$ and directs it to a computing circuit 9. A vehicle speed signal $v_F$ is also directed to this computing circuit 9 by the reference circuit 2. The computing circuit 9 determines vehicle transverse acceleration signals $a_{Fy}$ from the speed differential signal $\Delta v$ and the vehicle speed signal $v_F$.

The reference circuit 2, also, in addition to the vehicle speed signals $v_F$, forms vehicle longitudinal acceleration signals $a_{Fx}$ from the wheel speed signals $v_R$ that are directed to it. These may be obtained, for example, by a differentiating of the vehicle speed signals $v_F$.

It should be noted that reference circuit 2, logic unit 4 and computing circuit 9 may be implemented using micro-computers, for example an 8096 Intel or a 68 HC 11 Motorola.

As the input signals of a safety switching device 10, this safety switching device 10 receives:
from an acceleration sensor 11,
sensor longitudinal acceleration signals $a_{Sx}$,
sensor transverse acceleration signals $a_{Sy}$, and
sensor vertical acceleration signals $a_{Sz}$,
from the reference circuit 2,
the vehicle speed signals $v_F$, and
the vehicle longitudinal acceleration signals $a_{Fx}$,
from the computing circuit 9,
the vehicle transverse acceleration signals $a_{Fy}$,
from the signal processing circuit 1,
a wheel speed signal $v_{VR}$, and
from the logic unit 4,
its characteristic control signal w.

In the figures, an interrupted line indicates the transition of the above-listed input signals into the safety switching arrangement 10.

The elements and circuits described above are standard elements in motor vehicles and thus are not described in detail.

The safety switching arrangement 10 can be roughly divided into three blocks:
a longitudinal acceleration comparator circuit, abbreviated LV, 12, which, in turn, has a first LV-comparator 12.1, a second LV-comparator 12.2, a signal attenuating element 12.3, a long-time delay element 12.4 and an OR-gate 12.5;

a transverse acceleration comparator circuit, abbreviated QV, 13, having a first QV-comparator 13.1, a second QV-comparator 13.2, a delay time element 13.3, and an OR-gate 13.4; and a circuit 14 for obtaining certain comparable parts from sensor vertical acceleration and wheel acceleration signals having a first threshold value comparator 14.1, a second threshold value comparator 14.2, a differentiator 14.3, two filters 14.4 and 14.5, and two signal hold elements 14.6 and 14.7.

In addition, a window comparator 15 is provided in the safety switching arrangement 10 to which the vehicle speed signals $v_F$ are directed and which generates an enable signal f when the vehicle speed signals $v_F$ are between a lower threshold value $v_U$ and an upper threshold value $v_O$.

An AND-gate 16 receives:
output signals of the LV 12; and
the enable signal f of the window comparator 15.
An AND-gate 17 receives:
output signals of the QV 13; and
the enable signal f of the window comparator 15.
An AND-gate 18 receives the output signals of both delay time elements 14.6 and 14.7.

In addition, the characteristic control signal w of the logic unit 4 is directed to one inverting input each of all three AND-gate 16, 17 and 18. The outputs of the three AND-gates 16, 17, 18 are connected with inputs of an OR-gate 19, the output of which is connected to an end switching step 20. In its simplest form, the end switching step 20 is merely a splitter providing error signals e directly as a pair of error switching signals s to AND-gate 5 and amplifier 21. The output signals of the AND-gates 16, 17 and 18 and of the OR-gate 19 are error signals e, which control the end switching step so that it emits error switching signal s to the inverting input of the AND-gate 5 and to an amplifier 21. When an error switching signal s is present, AND-gate 5 switches on a warning light 22 that is located within the view of the driver of the vehicle.

The LV 12 operates as follows: Its output signals are the vehicle longitudinal acceleration signals $a_{Fx}$ which each are directed to an input of the two LV-comparators 12.1 and 12.2, and the sensor longitudinal acceleration signals $a_{Sx}$ that are directed to the second input of the first LV-comparator 12.1, and that are reduced in the signal attenuating element 12.3 by a certain constant value, such as 0.2 g, and directed to the second input of the second LV-comparator 12.2. Connected to the output of the first LV-comparator 12.1, is the long-time delay element 12.4 which delays an output signal of the LV-comparator 12.1 for a longer period of time, for example, 10 minutes. The LV-comparator 12.1 will generate this output signal when its two input signals $a_{Fx}$ and $a_{Sx}$ deviate from one another beyond a certain range. This range can be adjusted according to the requirements.

However, a deviation will occur also when the vehicle drives on upward slopes or downward slopes, because the slope output components of the gravitational acceleration affects the acceleration sensor 11 that is fixed at the body. As a result, the sensor longitudinal acceleration signals $a_{Sx}$ are falsified—in the case of a downward slope, by a "delay component", in the case of upward slopes, by an "acceleration component" that naturally cannot be contained in the vehicle longitudinal acceleration signals $a_{Fx}$ because these are derived only from the wheel rotating speed signals.

For the filtering-out of such deviations between $a_{Sx}$ and $a_{Fx}$ caused by slope output components, the long-time delay element 12.4 is provided which generates an output signal only when the output signal of the LV-comparator 12.1 is present uninterruptedly beyond the delay time period.

Short-time disorders of the acceleration sensor cannot be detected in this way even if they occur repeatedly. In order to be able to immediately evaluate at least considerable short-time deviations of the sensor longitudinal acceleration signals $a_{Sx}$ from the vehicle longitudinal acceleration signals $a_{Fx}$, the sensor longitudinal acceleration signals $a_{Sx}$ are reduced constantly in the signal attenuation element 12.3. When now the second LV-comparator 12.2, in the case of a corresponding of its input signals, generates an output signal, it may be assumed that the deviation of the two signals $a_{Sx}$ and $a_{Fx}$ from one another is larger than a deviation that is caused by slope output components of $a_{Sx}$, as long as $a_{Sx}$ was reduced sufficiently far, and that therefore a malfunctioning of the acceleration sensor 11 must be taking place. In this case an attenuation by 0.2 g corresponds to a slope position of 20%. If necessary, the attenuation constant can naturally be adjusted to other values.

Output signals of the long-time delay element 12.4 or of the second LV-comparator 12.2, via the OR-gate 12.5, arrive at an input of the AND-gate 16 which then generates its error signal e if, at the same time, the enable signal f of the window comparator 15 is present and not the characteristic control signal w.

The QV 13, in both QV-comparators 13.1 and 13.2, compares the sensor transverse acceleration signals $a_{Sy}$ with the vehicle transverse acceleration signals $a_{Fy}$. The first QV-comparator 13.1 will generate an output signal if the vehicle transverse acceleration signals $a_{Fy}$ are much larger than the sensor transverse acceleration signals $a_{Sy}$. This condition can also be reached by an understeering of the vehicle wherein the steerable wheels are locked more than what would correspond to the actual curve radius, and the vehicle "pushes over the front wheels" and correspondingly different wheel rotating speeds results.

The computing circuit 9 will then receive a speed differential signal $\Delta v$ that in no way corresponds to the actual transverse accelerations. Thus, the delay time element 13.3 is connected to the output of the first QV-comparator 13.1 to prevent generation of an error signal for short-time understeering. In the case of a short-time understeering of the vehicle, the output signal of the first QV-comparator 13.1 is present only for a short time. The delay time period of the time element 13.3 is proportioned such that understeering does not trigger an error signal e. Just as the long-time delay element 12.4 of the LV 12, the delay time element 13.3 of the QV 13 will generate an output signal only if the output signal of the QV-comparator 13.1 is continuously present longer than its delay time period, for example 3 seconds.

The second QV-comparator 13.2 generates an output signal only if the vehicle transverse acceleration signals $a_{Fy}$ are smaller than the sensor transverse acceleration signals $a_{Sy}$; i.e., the sensor 11 measures a stronger transverse acceleration than the one that corresponds to the actually driven curve. Output signals of the delay time element 13.3 or of the QV-comparator 13.2, via the OR-gate 13.4, reach an input of the AND-gate 17 which will then generate its error signal e if at the same time the enable signal f is present and not the characteristic control signal w.

In the circuit 14, certain modified signals are first determined from the wheel speed signals $v_{VR}$ by differentiating in the differentiator 14.3 and subsequent filtering of the wheel acceleration signals in the filter 14.4 (preferably a low-pass filter); and from the sensor vertical acceleration signals $a_{Sz}$ by filter 14.5 (also preferably a low-pass filter).

A relationship will then exist between these modified signals which is influenced by the transmission function of the spring-damper system of the vehicle.

Separately, the modified signal of the sensor vertical acceleration signals $a_{Sz}$ will then be directed to a threshold value comparator 14.1 and the modified signal of the wheel accelerations will be directed to a threshold value comparator 14.2.

The reference values of the two threshold value comparators 14.1 and 14.2 must be selected such that, when the acceleration sensor functions properly, the filtered modified signal cannot exceed their respective critical threshold value simultaneously and not with an only slight time-related offset.

Output signals of the two threshold value comparators 14.1 and 14.2 are in each case directed to a signal hold element 14.6 and 14.7, so that an exceeding of the threshold value that occurs with an only slight time-related offset, of the modified signal that are usually present only in pulse form, can also be detected. The outputs of the two signal hold elements 14.6 and 14.7 are connected to one input of the AND-gate 18 respectively.

As in the case of the AND-gates 16 and 17, the characteristic control signal w is directed to a third inverting input of the AND-gate 18. The AND-gate 18 will emit its error signal e when both signal hold elements 14.6, 14.7 are actuated simultaneously and the control signal w is not present at the same time.

The effect of the error signals e was described in the preceding text.

Figure 2:
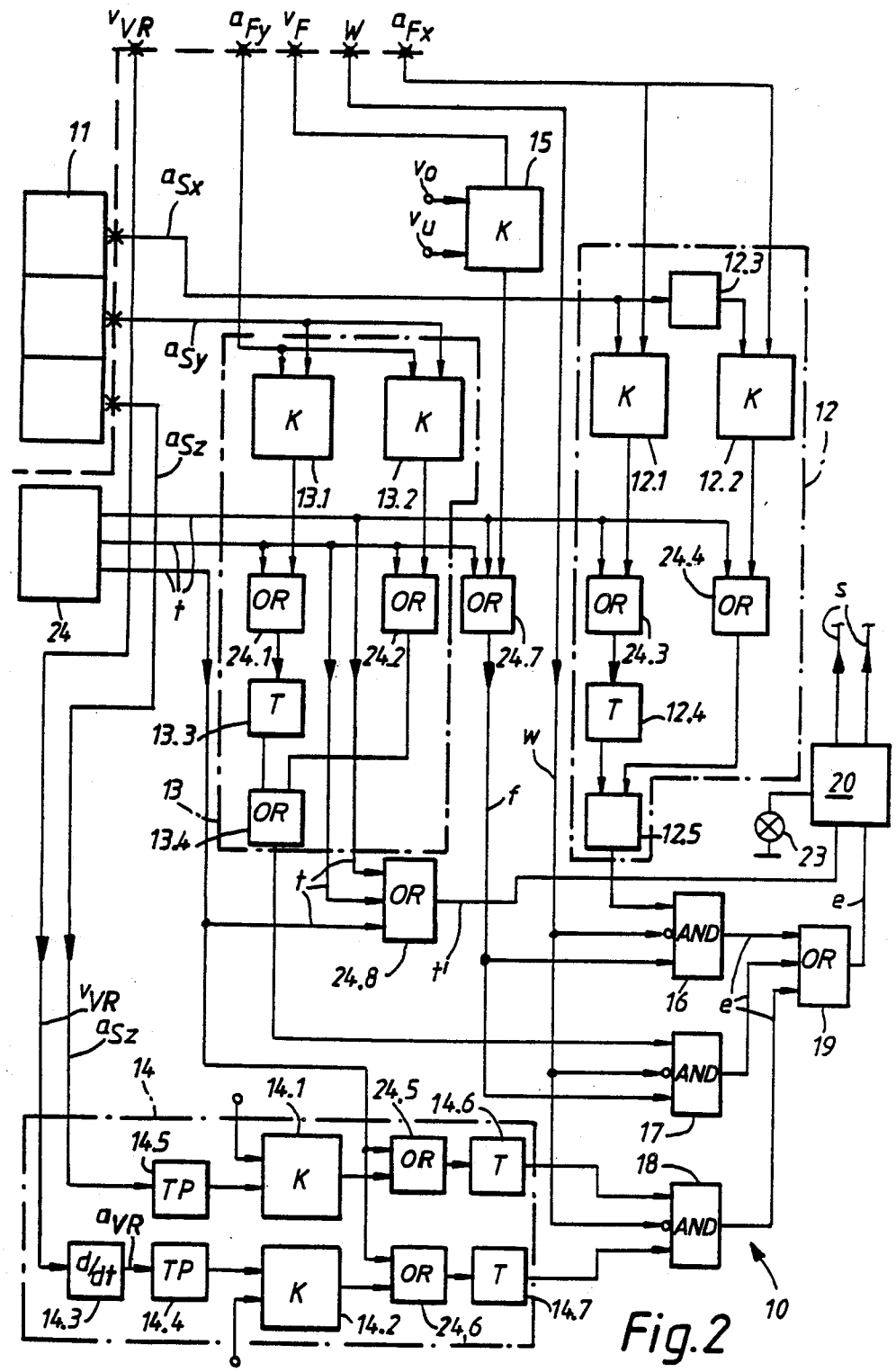
FIG. 2 is a portion of the block diagram according to FIG. 1 with an additional testing device for certain components of the safety switching arrangement.

In FIG. 2, a testing device was added to the safety switching arrangement 10. This testing device 24, in a way that is not shown, is controlled automatically, for example, by the logic unit 4, or arbitrarily, and will then generate test signals t which simulate output signals of the LV-comparators 12.1 and 12.2, of the QV-comparators 13.1 and 13.2, of the threshold value comparators 14.1 and 14.2, and of the window comparator 15. In the present case, these test signals t can be emitted particularly easily with a constant level, even if the output signals of the different comparators are binary signals with the level "HIGH" or logic "1". Via a number of O-gates, the test signals t for the safety switching arrangement 10 are combined with the respective comparators:

The output of the OR-gates are connected:
24.1 to the delay time element 13.3,
24.2 to the OR-gate 13.4,
24.3 to the long-time delay element 12.4,
24.4 to the OR-gate 12.5,
24.5 to the signal hold element 14.6,
24.6 to the signal hold element 14.7,
24.7 to the AND-gates 16 and 17.

The test signals t, in three separate testing cycles, can in each case be directed separately to the LV 12, the QV 13 and circuit 14. The OR-gate 24.7 therefore has three inputs because the enable signal f of the window comparator 15 must be simulated during the testing of the LV 12 as well as of the QV 13. In all three testing cycles, a test status signal t' is generated at another OR-gate 24.8 if at least one test signal t is present at one of its three inputs, and is directed to the end switching step 20. The test signals t are used for the performance testing of the time elements (12.4, 13.3, 14.6 and 14.7) and of the logic elements (12.5, 13.4, 16, 17, 18, 19) of the safety switching arrangement.

If test signals t are present, during a proper operation, error signals e must reach the end switching step 20. The test status signal t', on the one hand, is used for the testing of the error signals with respect to their simultaneous arrival, and, on the other hand, it suppresses the generating of the error switching signal s by the end switching step when the error signals e were generated by the test signals t.

If, within a certain period of time, no error signals e arrive at the end switching step 20 when test status signal t' is present, the driver of the vehicle will receive a warning signal by the switching-on of a warning light 23.

Although the embodiment introduces an overall representation of the safety switching arrangement 10 with the testing of all three acceleration signal components $a_{Sx}$, $a_{Sy}$, and $a_{Sz}$ of the acceleration sensor 11, naturally, if required, any of the components can also be monitored separately, just as well as the testing signals t can be generated successively in three testing cycles. In addition, the inclusion of the acceleration sensor 11 into the control system was left open intentionally with respect to signalling technology, because naturally an acceleration sensor of a different operating method can also be monitored by the arrangement according to the invention according to the indicated process.

Finally, a possible signal connection will be discussed from the logic unit 4 to the reference circuit 2 (interrupted line in FIG. 1). Via this connection, the logic unit 4 can control the reference circuit 2 for emitting predetermined vehicle speed and vehicle acceleration signal sequences, if, for any reason, these cannot be determined instantaneously from the wheel rotating speed signals.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A safety switching arrangement for monitoring and controlling the operations of an electromechanical control system that ensures the adhesion of heels of a motor vehicle, such as an antilock system or an antislip control system by a control system control signal, that is equipped with wheel rotation speed signal generators and a reference circuit for the determination of the wheel speeds, vehicle speed and vehicle acceleration from wheel rotation speeds, said safety switching arrangement comprising:
   first input means for receiving first set of vehicle acceleration signals derived from wheel speeds and vehicle speed, in said reference circuit;
   second input means for receiving second set of vehicle acceleration signals from acceleration sensors fixed at the vehicle;
   evaluation means for comparing said first and second set of acceleration signals to determine whether they match within a band width and generating an error signal to disable said control system and activate a warning indicator when the acceleration signals do not match within said band width; and
   third input means for receiving a control system control signal as a blocking signal and suppressing said evaluation means from generating an error signal in response to said blocking signal.

2. A safety switching arrangement according to claim 1 wherein:
   said first input means receives vehicle longitudinal acceleration signals from said reference circuit;
   said second input means receives sensor longitudinal acceleration input signals; and
   said evaluation means includes longitudinal acceleration comparing means for determining if the vehicle and sensor longitudinal acceleration signals match within a bandwidth and generating an error signal when they do not match within said bandwidth and a blocking signal is absent.

3. A safety switching arrangement according to claim 2 wherein:
   said first input means receives vehicle transverse acceleration signals from said reference circuit;
   said second input means receives sensor transverse acceleration input signals; and
   said evaluation means includes transverse acceleration comparing means for determining if the vehicle and sensor transverse acceleration signal match within a bandwidth and generating an error signal when they do not match within said bandwidth and a blocking signal is absent.

4. A safety switching arrangement according to claim 2 including a fourth input means for receiving vehicle speed signals from the reference circuit; and
   window comparator means for generating an enable signal which enables longitudinal acceleration comparator means to generate error signals only if the driving speed signals are in a window range between a lower and an upper barrier of the vehicle speed.

5. A safety switching arrangement according to claim 3 wherein:
   said first input means receives at least one wheel speed signal and includes a differentiator means for generating wheel acceleration signal from said wheel speed signal;
   said second input means receives sensor vertical acceleration input signals; and
   said evaluation means includes first and second filtering means for filtering said wheel acceleration signal and sensor vertical acceleration input signals respectively, first and second threshold value comparator means for comparing filtered signals from said first and second filtering means respectively, and logic means for generating an error signal when output signals of said first and second threshold value comparators occur substantially simultaneously.

6. A safety switching arrangement according to claim 2 wherein said longitudinal acceleration comparing means includes:
   first comparator means for comparing the vehicle longitudinal acceleration signals and the sensor longitudinal acceleration signals;
   second comparator means, having an attenuator means at one input, for comparing the vehicle longitudinal acceleration signals and attenuated sensor longitudinal acceleration signals attenuated by said attenuating means;

a time delay means connected to the output of the first signal comparator means; and AND means having a first input for receiving the output of the time delay means and the output of the second signal comparator means, a second inverter input for receiving the control system control signal and an output for generating said error signal.

7. A safety switching arrangement according to claim 3 wherein said transverse acceleration comparing means includes:

first signal comparator means for generating an output signal when the vehicle transverse acceleration signals are significantly higher than the sensor transverse acceleration signals;

a delay time means connected to the output of first signal comparator means;

second signal comparator means for generating an output signal when the vehicle transverse acceleration signals are smaller than the sensor transverse acceleration signals; and AND means having a first input for receiving the output of the delay time means and the output of the second signal comparator means, a second inverting input for receiving the control system control signal and an output for generating said error signal.

8. A safety switching arrangement according to claim 6 including:

a fourth input means for receiving vehicle speed signals from the reference circuit;

window comparator means for generating an enable signal only if the driving speed signals are in a window range between a lower and an upper barrier of the vehicle speed; and said AND means includes a third input receiving said enable signal.

9. A safety switching arrangement according to claim 5 wherein:

said logic means includes first and second signal holding means connected to the output of said first and second threshold value comparator means respectively; and an AND-means having a first and second inputs for receiving output of said first and second signal holding means respectively, a third input for receiving said control system control signal and an output for generating said error signal.

10. A safety switching arrangement according to claim 5 wherein:

said longitudinal and transverse acceleration comparing means each include signal comparator means for comparing and logic means for generating said error signal;

including testing means for (a) generating test signals that simulate output signals of said signal comparator means and said threshold value comparator means and applying said test signals to a respective logic means for generation of said error signal; and (b) generating test status signal to prevent disabling of said control system and prevent activation of said warning indicator by said error signal during testing.

11. A safety switching arrangement according to claim 10, wherein said testing means generates testing signals in three successive testing cycles, in each respective testing cycle, test signals are applied only to one of the logic means for longitudinal, transverse and vertical acceleration.

12. A safety switching arrangement according to claim 10, including an additional display and means for activating said additional display when an error signal fails to occur when the test status signal is present.

13. A safety switching arrangement according to claim 10, including a fourth input means for receiving vehicle speed signals from the reference circuit;

window comparator means for generating an enable signal which enables longitudinal acceleration comparator means to generate error signals only if the driving speed signals are in a window range between a lower and an upper barrier of the vehicle speed; and said testing means generates test signals that simulate the release signal of the window comparator.

14. A safety switching arrangement according to claim 6 including testing means for (a) generating test signals that simulate output signals of said comparator means and applying said test signals to said time delay means and first input of said AND means for generation of said error signals; and (b) generating test status signal to prevent disabling of said control system and prevent activation of said warning indicator by said error signal during testing.

15. A safety switching arrangement according to claim 7 including testing means for (a) generating test signals that simulate output signals of said comparator means and applying said test signals to said time delay means and first input of said AND means for generation of said error signals; and (b) generating test status signal to prevent disabling of said control system and prevent activation of said warning indicator by said error signal during testing.

16. A safety switching arrangement according to claim 2 wherein:

said first input means receives at least one wheel speed signal and includes a differentiator means for generating wheel acceleration signal from said wheel speed signal;

said second input means receives sensor vertical acceleration input signals; and said evaluation means includes first and second filtering means for filtering said wheel acceleration signal and sensor vertical acceleration input signals respectively, first and second threshold value comparator means for comparing filtered signals from said first and second filtering means respectively, and logic means for generating an error signal when output signals of said first and second threshold value comparators occur substantially simultaneously.

17. A safety switching arrangement according to claim 16 including:

a fourth input means for receiving vehicle speed signals from the reference circuit;

window comparator means for generating an enable signal only if the driving speed signals are in a window range between a lower and an upper barrier of the vehicle speed; and said AND means includes a third input receiving said enable signal.

18. A safety switching arrangement according to claim 7 including:

a fourth input means for receiving vehicle speed signals from the reference circuit;

window comparator means for generating an enable signal only if the driving speed signals are in a window range between a lower and an upper barrier of the vehicle speed; and said evaluation means includes an input for receiving said enable signal which enables generation of an error signal.

19. A method for monitoring and controlling the operations of an electromechanical control system that ensures the adhesion of wheels of a motor vehicle, such as an antilock system or an antislip control system by a control system control signal, that is equipped with wheel rotation speed signal generators and a reference circuit for the determination of the wheel speeds, vehicle speed and vehicle acceleration from wheel rotation speeds, comprising the steps of:

generating vehicle acceleration signals by acceleration sensors fixed at the vehicle;

comparing vehicle acceleration signals from said reference circuit and from said acceleration sensors to determine whether they match within said band width; and generating an error signal to disable said control system and activate a warning indicator when the acceleration signals do not match within said band width during the absence of a control system control signal.

* * * * *